INVENTORS.
JOHN C. REIS
BERNARD I. SOMMER
THOMAS E. ENNIS
BY
Wolfe, Hubbard, Voit & Osann
ATTORNEYS.

INVENTORS.
JOHN C. REIS
BERNARD I. SOMMER
THOMAS E. ENNIS
BY Wolfe, Hubbard, Voit & Osann
ATTORNEYS.

United States Patent Office 3,431,510

Patented Mar. 4, 1969

3,431,510

OSCILLATOR SYSTEM WITH MALFUNCTION DETECTING MEANS AND AUTOMATIC SWITCH-OVER CIRCUIT

John Crittenton Reis, Elmhurst, Bernard Irving Sommer, Glenview, and Thomas E. Ennis, Niles, Ill., assignors to General Time Corporation, Stamford, Conn., a corporation of Delaware Filed Oct. 13, 1967, Ser. No. 675,111

U.S. Cl. 331—49 8 Claims

ABSTRACT OF THE DISCLOSURE

A high reliability oscillator system including a primary oscillator, a secondary oscillator, and a reference oscillator. The output frequencies of the primary and secondary oscillators are alternately compared with the output frequency of the reference oscillator and their amplitudes are also continuously monitored. Switch-over from the output of the primary oscillator to the output of the secondary oscillator occurs if there is an indication of frequency drift in the output of the primary oscillator but only if the output frequency and amplitude of the standby oscillator are indicated to be satisfactory.

This invention relates generally to high reliability oscillators and more particularly to oscillator systems of the type wherein a standby oscillator is substituted for a primary oscillator in the event of failure of the primary oscillator.

It is a general object of the present invention to provide a high reliability fixed frequency oscillator system capable of continuing to produce an output signal at a designated nominal frequency even after failure of the primary oscillator of the system. It is a more specific object of the invention continuously to monitor the outputs of a primary and a secondary oscillator in a high reliability oscillator system both as to frequency and amplitude so as to assure prompt switch-over from the primary oscillator to the secondary oscillator of the system in the event of failure of the primary oscillator but only if the secondary oscillator of the system produces a satisfactory output.

It is a more specific object of the present invention to provide a frequency monitoring system for a high reliability oscillator system wherein the frequencies of the outputs of the primary and secondary oscillators of the system are compared with the frequency of a reference oscillator. In this connection it is an object of the invention to provide a frequency comparing system capable of alternately comparing the frequencies of the primary and secondary oscillators with the frequency of the reference oscillator on a time-shared basis so as to give an immediate indication of a frequency drift in the output of either one of the primary and secondary oscillators.

Other objects and advantages of the invention will become apparent as the following description proceeds taken in conjunction with the accompanying drawings, in which.

While the invention has been described in connection with a preferred embodiment, it will be understood that it is not intended to be limited to the particular embodiment shown but, on the contrary, is intended to cover the various alternative and equivalent constructions included within the spirit and scope of the appended claims.

Figure 1:
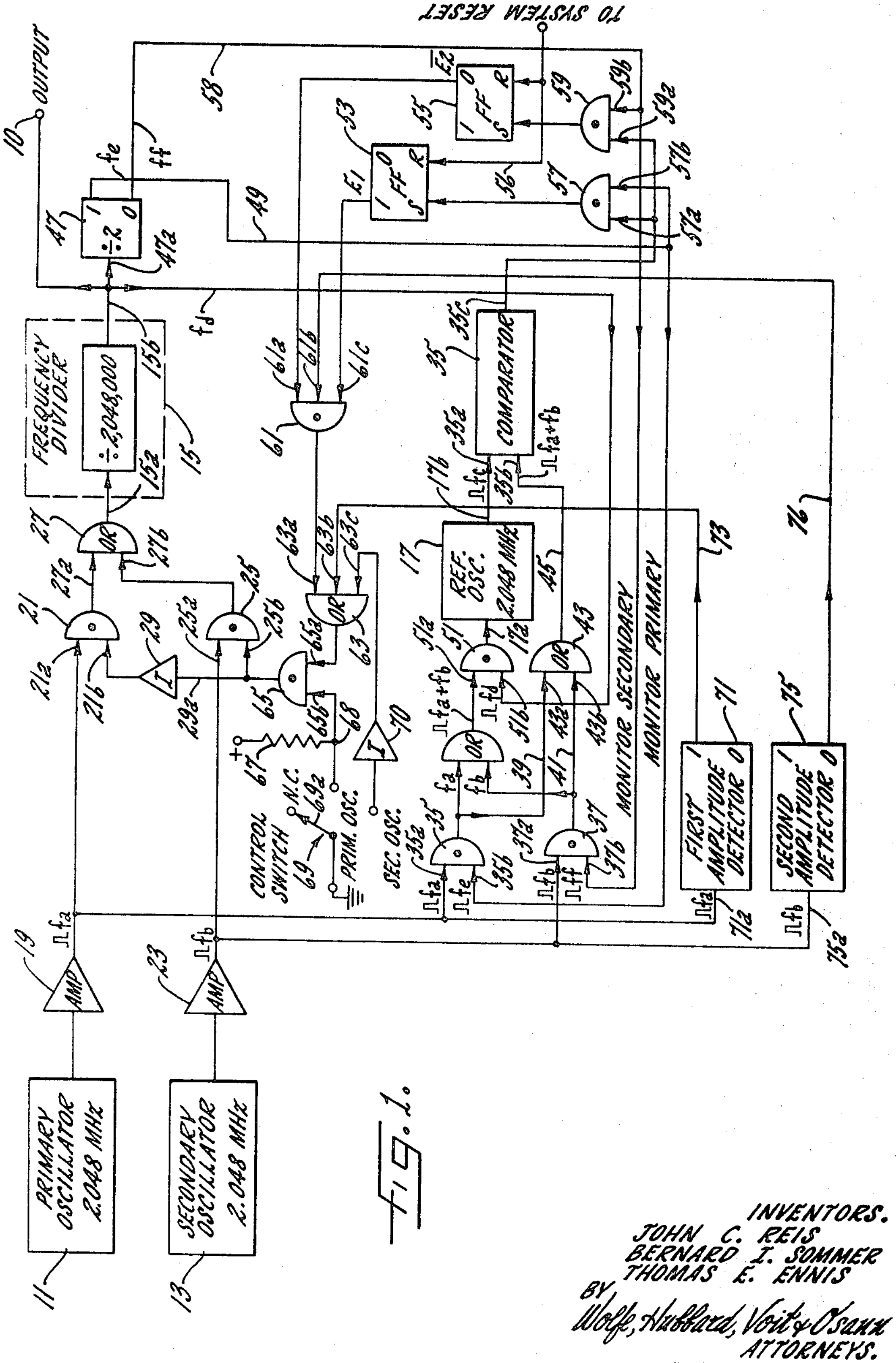
FIGURE 1 is a block diagram of an oscillator system incorporating features of the present invention.

Referring more particularly to the drawings, an exemplary oscillator system incorporating features of the invention is shown in FIG. 1. The particular system illustrated is designed to produce a signal at an output 10 at a frequency which is accurately held near one cycle per second. This low frequency output is produced by means of a primary oscillator 11 generating a primary output signal $f_a$ or, in the case of failure of the primary oscillator, by means of a secondary oscillator 13 producing a standby output signal $f_b$ at the same frequency, 2.048 mHz. The output of the selected oscillator is then divided in frequency by 2,048,000 by means of a frequency divider 15. In accordance with a principal feature of the invention the system includes a reference oscillator 17 which generates a reference signal $f_c$, at the same frequency as that selected for output signals $f_a$ and $f_b$ as well as means for comparing the frequencies of the primary and standby signals $f_a$ and $f_b$ with the frequency of the reference signal $f_c$. Means are also provided for producing first and second error signals E1 and E2 when the frequency of respective ones of the primary and standby signals $f_a$ and $f_b$ varies by more than a predetermined amount from the frequency of the reference signal. Finally, there is connected between the primary and secondary oscillators 11 and 13, and the output point 10 of the system a control means, shown as a set of gates, for normally applying the primary oscillator signal $f_a$ to the output point and for substituting the standby output signal $f_b$ in place of the primary output signal $f_a$ in response to the presence of the first error signal E1 at the output of the frequency comparing means, but only if the second error signal E2 is absent therefrom.

To permit selection of the desired oscillator the outputs of the oscillators 11 and 13 are applied to the input of the frequency divider 15 through individual channels, comprising amplifier 19 and AND gate 21 for the primary oscillator 11, and amplifier 23 and AND gate 25 for oscillator 13. The outputs of AND gates 21 and 25 are applied to the single input **15*a* of the frequency divider 15 through a common OR gate 27. The frequency divider 15** need not be described in detail since circuits for performing its function are well known to those skilled in the art. A typical circuit for performing frequency division by the factor indicated in the exemplary circuit of FIG. 1 would include a series of eleven cascaded flip-flops forming a binary counter which produces a pulse at its output for every 2,048 pulses fed to its input. The output pulses from this straight-binary frequency divider would be fed to the input of a three decade binary-coded decimal frequency divider, each decade of which comprises a binary-coded decimal counter having four flip-flops connected in such a manner that each decade produces one output pulse for evrey ten input pulses fed to its input. The three binary-coded decimal decades together would produce an output pulse at the output of the third decade for every 1,000 pulses applied to the input of the first decade, so that in combination the eleven flip-flop straight-binary counter and the three decade binary-coded decimal counter would be suitable to perform frequency division by a factor of 2,048,000.

It is a basic object of the invention to assure that signals from one or the other, but not both, of the oscillators 11 and 13 be always supplied to the output point 10. Consequently, the second inputs of the AND gates 21 and 25 are energized by signals having mutually opposite logic values, i.e. logic "0" and logic "1." This is achieved simply by means of an inverter 29 connected between the second inputs **21*b* and 25*b* of the two AND gates 21 and 25 respectively. As a result, the appearance of a logic "1" or enabling signal at the AND gate input 25*b* will automatically result in the appearanec of a logic "0" or disabling signal at the AND gate input 21***b*. Conversely, a disabling, or logic "0" level, signal at the input 25*b* of the AND gate 25 will result in an enabling signal at the input 21*b* of AND gate 21. The manner in which the signal appearing at the input 25*b* of AND gate 25 is produced and the manner in which it is determined whether it is to be a logic "1" or a logic "0" level signal forms an important part of the present invention and will appear as this description proceeds.

Figure 2:
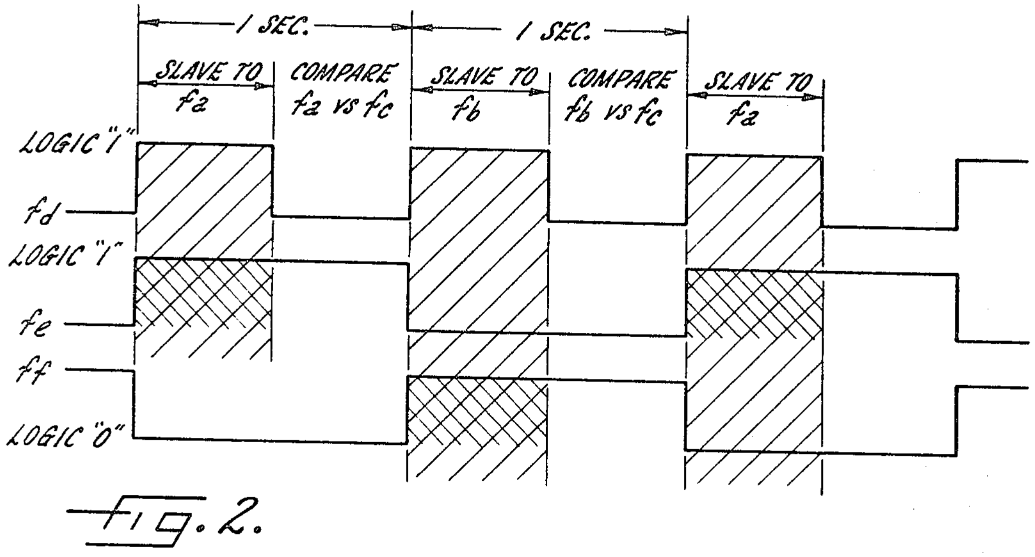
FIG. 2 is a series of waveforms illustrating the operation of the time-shared frequency comparator disclosed in FIG. 1.

In carrying out the invention, the outputs $f_a$ and $f_b$ of the oscillators 11 and 13 are continuously monitored by comparing their frequencies with the frequency of the signal $f_c$ produced by reference oscillator 17. This frequency comparison might be carried out by individual frequency comparators, one for each of the oscillators 11 and 13. However, in accordance with a more specific aspect of the invention, there is provided and disclosed in FIG. 1 a particularly effective arrangement whereby a single phase comparator 35 is time-shared in such a manner that the outputs $f_a$ and $f_b$ of the oscillators 11 and 13 are alternately compared with the frequency of the reference signal $f_c$ during first and second series of interleaved time intervals respectively. In accordance with this aspect of the invention, the amplified output signal $f_a$ of the primary oscillator 11 is applied to one input of a first time-share control AND gate 35. Similarly, the amplified output $f_b$ of the secondary oscillator 13 is applied to one input of a second time-share control AND gate 37. The outputs of AND gates 35 and 37 are individually connected through lines 39 and 41 respectively to a pair of inputs 43*a* and 43*b* of an OR gate 43 whose output in turn is connected through a line 45 to an input 35*b* of the comparator 35. Each of the time-share control AND gates 35 and 37 has a second input and it will be apparent that, by enabling the second input 35*b* of the AND gate 35, the output $f_a$ of the primary oscillator 11 may be caused to be applied through OR gate 43 to the comparator input 35*b* and that similarly, the output $f_b$ of the secondary oscillator 13 may be applied to the same comparator input by enabling the second input 37*b* of the AND gate 37 instead. In accordance with the invention the second inputs of the AND gates 35 and 37 are alternately enabled so as to cause the signals $f_a$ and $f_b$ to be applied alternately over the line 45 to the comparator input 35*b*. The signals for so enabling the AND gate inputs 35*b* and 37*b* are labeled $f_e$ and $f_f$ and are shown in FIG. 2. They are seen there to be mutually complementary square wave trains. Thus, both of them alternate periodically between logic "0" (low) and logic "1" (high) voltage levels, but the two signals are never at the same logic level, so that the AND gates 35 and 37 are both periodically enabled but always at different times.

To generate the control signals $f_e$ and $f_f$, a complementing flip-flop 47 is provided, with its "1" output connected over line 49 labeled "Monitor Primary" to AND gate input 35*b*, and with its "0" output connected over line 58 labeled "Monitor Secondary" to AND gate input 37*b*. In further keeping with the objects of the present invention, not only are the output signals $f_a$ and $f_b$ alternately applied to the comparator 35, but each of those signals is applied to the comparator 35 during alternate cycles of the signal appearing at the output 10 of the oscillator system. Stated differently, in the preferred embodiment of the invention no more than two cycles of the output signal $f_d$ are permitted to elapse without there being a test of the frequencies of the outputs produced by both the primary oscillator 11 and the secondary oscillator 13. To this end the input 47*a* of the complementing flip-flop 47 is connected to the output 10 of the system. Inspection of FIG. 2 will show that, during a first series of alternate cycles of the output signal $f_d$ appearing at the output terminal 10 of the system a logic "1" voltage level, in the form of the flip-flop output $f_e$, is applied to the AND gate input 35*b* and that, during a second series of alternate cycles of the output signal $f_d$ interspersed with the first series of such signals a logic "1" voltage level is applied in the form of the signal $f_f$ to the AND gate input 37*b* of the system.

In accordance with yet another specific feature of the invention the reference oscillator 17 includes a phase locking circuit whereby the phase of the oscillator 17 is conformed to the phase of a signal applied to the phase locking circuit of the oscillator. The output of the oscillator 17 is applied to an input 35*a* of the comparator 35 and the respective amplified outputs of the primary and secondary oscillators 11 and 13 are applied to the phase locking circuit of the reference oscillator 17 during equal initial portions of the time intervals in which those outputs are being applied to the other input 35*b* of the phase comparator 35, thereby permitting the reference oscillator 17 to operate at its nominal frequency during the terminal portions of the time intervals. That is, during the initial portions of those time periods in which the primary output signal $f_a$ is gated to the comparator input 35*b* the reference oscillator 17 is phase locked to the signal $f_a$, and similarly, during the initial portions of the alternate time periods, in which the standby signal $f_b$ is gated to the comparator, the reference oscillator is slaved to the standby signal $f_b$. During the terminal portions of the time periods the reference oscillator is allowed to return to its nominal frequency and an excessive phase difference accumulated during the terminal portion of any time period between the reference oscillator output signal and the signal gated to the other input of the comparator 35 is detected.

Turning now to the details of the exemplary circuit shown in FIG. 1, the reference oscillator 17 has an input 17*a* going to a phase locking circuit forming part of the oscillator. In the absence of a signal at its input 17*a*, the reference oscillator 17 operates at its designated nominal frequency and applies a square wave output $f_c$ of that frequency to the comparator input 35*a*. This nominal frequency is the same as the desired frequency of the other two oscillators 11 and 13. Oscillators with phase locking circuits are well known to those skilled in the art and will not be described here in detail. A phase locked oscillator is described, for example on pages 741–744 of "Pulse, Digital and Switching Waveforms" by Millman and Taub, published in 1965 by McGraw-Hill Book Co. Inc. It is sufficient to note that, so long as a phase locking signal is applied to the input 17*a* of the reference oscillator, the output $f_c$ will be exactly in phase with the phase locking input signal. As soon as the input signal is removed from the oscillator input 17*a*, the frequency of the output signal $f_c$ of the oscillator will return to the natural frequency of the oscillator.

In carrying out the detailed feature of the invention under consideration, the output signal $f_a$ of the primary oscillator 11, gated by the control signal $f_e$ through the first time-share control AND gate 35, and the standby signal $f_b$, gated through the second time-share control AND gate 37 by the control signal $f_f$, are both applied to the first input 51*a* of a phase lock control AND gate 51. Consequently, the signals $f_a$ and $f_b$ are applied at the AND gate input 51*a* during alternate cycles of the output signal $f_d$. Referring to FIG. 2, the control signal $f_e$ is at logic "1" voltage level during the first and third cycles of the output signal $f_d$ there shown, and therefore, the primary output signal $f_a$ appears at the AND gate input 51*a* during the first and third cycles of the output signal $f_d$. Conversely, since the second control signal $f_f$ is at logic "1" voltage level during the second cycle there shown, the standby output signal $f_b$ will appear at the AND gate input 51*a* during the second cycle of the output signal $f_d$ shown in FIG. 2.

As stated previously, it is only during the initial portion of a given cycle of the output signal $f_d$ that the reference oscillator 17 is to be slaved to a respective one of the signals $f_a$ and $f_b$. Toward this end, a second input 51*b* of the AND gate 51 receives a logic "1" voltage level signal only during the initial portion of each cycle of the output signal $f_d$. This is conveniently accomplished by applying the output signal $f_d$ itself to the AND gate input 51*b*, since only during the first half of the cycle of the signal is the signal at logic "1" level, so that only during the first half of every cycle of the signal $f_d$ will the AND gate 51 be enabled. Thus, in the particular embodiment shown in FIG. 1 the initial period of every cycle of the output signal $f_d$ during which the reference oscillator 17 is phase locked to a respective one of the signals $f_a$ and $f_b$ is one half the cycle and these initial portions are shown cross hatched in FIG. 2. It may be confirmed from the legends which appear above the cross hatched portions of $f_d$, that the reference oscillator 17 is slaved to alternate ones of the signals $f_a$ and $f_b$ during the initial portion of alternate cycles of the signal $f_d$.

Figure 3:
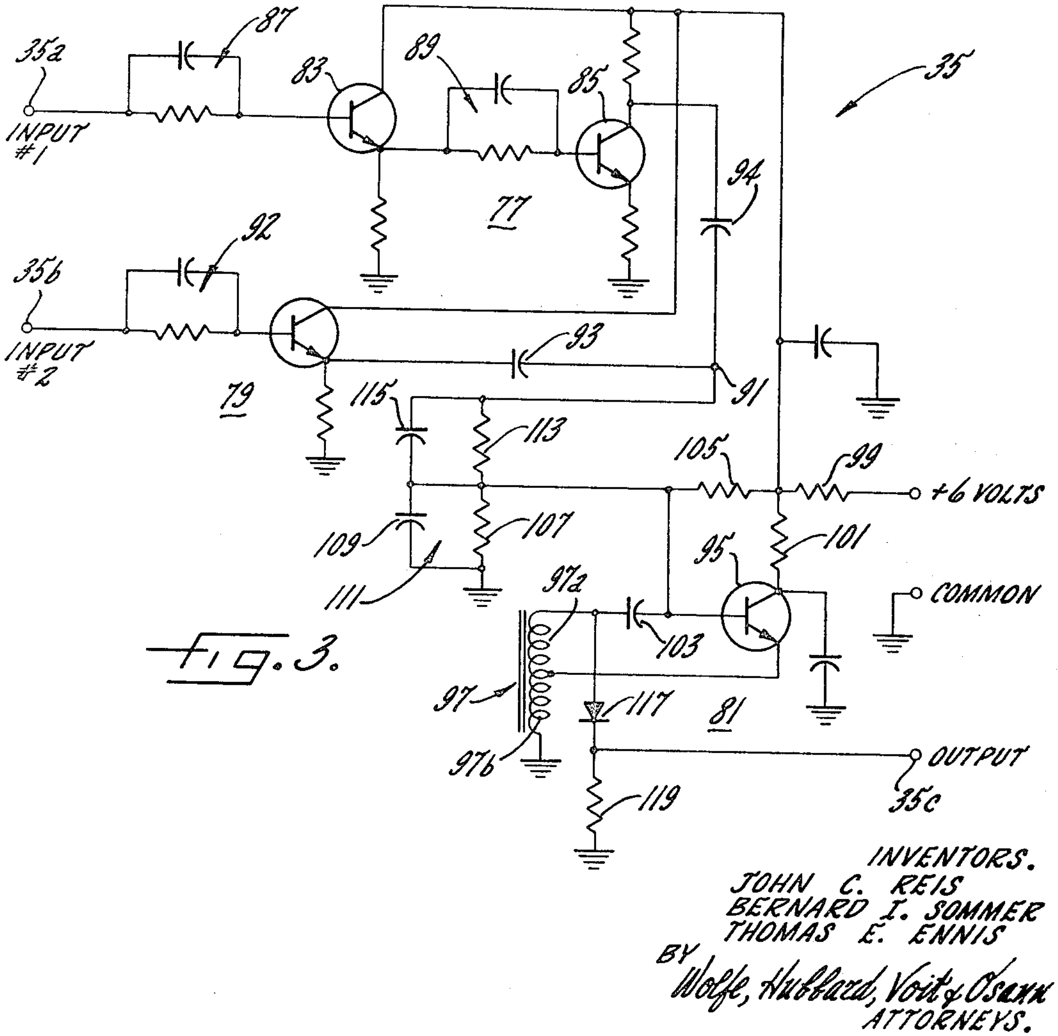
FIG. 3 is a schematic diagram of an exemplary phase comparator suitable for use in the system of FIG. 1.

There is shown in FIG. 3 and there will be described in a subsequent portion of this specification a particular circuit for the comparator 35. It is not necessary to understand the operation of that circuit in order to understand the operation of the overall system which is being described here. It is sufficient to note that the phase comparator 35 is operative to produce a pulse of prescribed amplitude and pulse width if the timing error between two square wave trains of a prescribed frequency (here shown as 2.048 mHz.) approaches a predetermined amount over a given time interval, and in particular, to produce such a pulse during a time interval preceded by another time interval during which the two input square waves have been phase locked. In the exemplary circuit shown in FIG. 1 the comparator 35 will produce an error signal near the end of a given cycle of the output signal $f_d$ (whether it be derived from signal $f_a$ or $f_b$) if the phase difference between the reference signal $f_c$ and the primary output signal $f_a$ accumulated during the second half of that cycle is excessive. Similarly, the comparator will produce an error signal during the next cycle of the signal $f_d$ if the phase difference between the reference signal $f_c$ and the standby output signal $f_b$ accumulated during the second half of that cycle is in excess of the predetermined phase (or time) difference limit. For convenient reference, the phase error signal which may be generated by the comparator 35 due to a frequency error in the primary output signal $f_a$ will be referred to as a "first" error signal E1, and similarly, an error signal which may be produced in response to a frequency error in the standby output signal $f_b$ will be referred to as a "second" error signal E2. It will be understood, however, that both the first and second error signals will appear at the same output terminal 35*c* of the comparator 35.

The first and second error signals E1 and E2 which may be produced by the comparator 35 play an important part in a decision by the system as to whether or not to switch over from the primary oscillator to the secondary oscillator 13. These error signals however appear at a single output 35*c* of the comparator. The only criterion which is unique to the error signals is the time during which they occur. That is, if the error signal appearing at the output of 35*c* of the comparator is produced during a given cycle of the output signal, then it is known that the error signal is one which represents a frequency deviation in the primary output signal $f_a$. If, on the other hand, this error signal appears during the next cycle of the output signal $f_d$ then by appropriate means it may be determined that the error signal represents a frequency deviation in the standby output signal $f_b$. In carrying out the invention, the first and second error signals E1 and E2, which are identified only by the times of their occurrence, are stored in first and second signal storage means, shown as standard, two input flip-flops 53 and 55 respectively. The comparator output 35*c* is connected to inputs 57*a* and 59*a* of a pair of AND gates 57 and 59, and through them to the SET inputs of both flip-flops 53 and 55. However, a second input 57*b* of the AND gate 57 is enabled only during those cycles of the output signal $f_d$ during which the primary output signal $f_a$ is being gated to the comparator input 35*b*. Conversely, a second input 59*b* of the AND gate 59 is enabled only during those other cycles of the output signal $f_d$ during which the standby output signal $f_b$ is being applied to the comparator input 35*b*. This is achieved in a straightforward manner by connecting the second, or qualifying, input 57*b* of the AND gate 57 to the line 49, and by connecting the second, or qualifying, input 59*b* of the AND gate 59 to line 58 so that the gates 57 and 59 are respectively qualified to deposit an error signal appearing at the comparator output 35*c* in respective ones of the flip-flops 53 and 55 during alternate cycles of the output signal $f_d$ defined by the time periods during which the time-share control signals $f_e$ and $f_f$ are at logic "1" voltage levels. Thus, the first storage means 53 is gated to receive the first error signal E1 and the second storage means 55 is gated to receive the second error signal E2.

The presence of a first error signal E1 in the flip-flop 53 is indicated by a logic "1" voltage level at its "1" output. Conversely, the presence of a second error signal E2 in the flip-flop 55 is indicated by a logic "1" voltage level at its "1" output. Initially, when the system is started, both of the flip-flops 53 and 55 are preset by applying an appropriate signal over a line 56 to their RESET inputs. Thus, unless an error signal is received by one of them both flip-flops 53 and 55 continue to produce logic "0" voltage levels on their "1" outputs. Furthermore, the absence of an error signal E2 in the flip-flop 55 is indicated by a logic "1" voltage level at its "0" output. Unless the amplitude of the primary output signal $f_a$ is inadequate, a condition which will be discussed hereinafter, a necessary condition for switching over from the primary oscillator 11 to the secondary oscillator 13 is that a first error signal E1 shall be present in the first storage flip-flop 53, indicating that the frequency of the primary output signal $f_a$ has drifted beyond permissible limits. Accordingly, the "1" output of the flip-flop 53 is connected through a series of three logic gates, an AND gate 61, an OR gate 63 and another AND gate 65 to the inputs 25*b* and 29*a* of the AND gate 25 and the inverter 29. From the initial discussion of the system it will be recalled that a logic "1" voltage level signal at the inputs 25*b* and 29*a* will cause a switch-over from the primary oscillator 11 to the secondary oscillator 13.

The purpose of the first AND gate 61 is to insure that a switch-over is permitted to occur only if a second error signal E2 has not been stored in the second storage flip-flop 55, that is, if the comparator 35 has not detected an excessive frequency deviation in the output of the secondary oscillator 13. Therefore, the "0" output of the second flip-flop 55 is connected to an input 61*a* of the AND gate 61, automatically disqualifying the AND gate if a second error signal E2 should be stored in the flip-flop 55. The reason for this provision is that, if there should be a frequency error indication in both of the flip-flops 53 and 55 it would be probable that it was the reference oscillator 17 whose frequency drifted, rather than that of both of the primary and secondary oscillators 11 and 13, since the simultaneous failure of these two oscillators is much less probable than the single failure of the reference oscillator 17. Accordingly, provided that the middle input of the three input AND gate 61 is enabled, the AND gate is qualified if, and only if, an error signal is stored in flip-flop 53 but not in the flip-flop 55. If the above conditions are met, the logic "1" signal appearing at the output of AND gate 61 is passed through the OR gate 63.

The output of the OR gate 63 might be connected directly to the inputs of the AND gate 25 and the inverter 29 but, as an optional feature, the output of the OR gate 63 is first applied to an input 65*a* of an additional AND gate 65. The second input 65*b* of the AND gate 65 is connected to a source of logic "1" voltage level through a voltage dropping resistor 67. The junction point 68 of the resistor 67 and the AND gate input 65*b* is connected to the second of three contacts of the multi-position control switch 69 having a movable contact 69*a* connected to ground (or logic "0") level.

In the normal operating mode of the system, the movable contact 69*a* is in its top position as shown. Consequently, a logic "1" voltage level is applied to the AND gate input 65*b*, and the signal appearing at the output of the OR gate 63 passes through the AND gate 65 and is applied to the inputs 25*b* and 29*a* of the AND gate 25 and the inverter 29. Optionally, if it is desired to prevent the secondary oscillator 13 from being connected to the output 10 of the system, the control switch contact 69*a* is placed in the second position, thereby connecting the AND gate input 65*b* to ground and thus disqualifying the AND gate 65. In this case the signal necessary to enable the AND gate 25 cannot pass through the AND gate 65 and the system will continue to operate on the primary oscillator 11 regardless of any frequency drift in the oscillator's output.

If, on the other hand, it is desired to switch over to the secondary oscillator 13 manually, the control switch 69 is placed in its third position wherein the movable contact 69*a* engages the bottom contact of the switch, shown to be connected through an inverter 70 to a third input 63*c* of the OR gate 63. As a result, the ground, or logic "0," voltage level on the movable contact 69*a* of the control switch 69 is applied as a logic "1" signal to the OR gate 63 and through the OR gate to the first input 65*a* of the AND gate 65 as a "dummy" error signal and is operative to enable the AND gate 25 and to disable the AND gate 21, thus causing the output of the primary oscillator 11 to be removed from and the output of the secondary oscillator 13 to be applied to the output terminal 10 of the system.

As thus far described, and with the assumption that a logic "1" voltage level is being applied to the input 61*b* of the AND gate 61, or conversely, that the AND gate 61 has only two inputs, 61*a* and 61*c*, the system is operative to cause the output of the primary oscillator 11 to be removed from the system and to have the output of the secondary oscillator 13 substituted therefor if there should be an excessive frequency drift in the output of the oscillator 11, but not in the output of the secondary oscillator 13. As an added feature of the invention, however, means are also provided for monitoring the amplitude of the output signals produced by the oscillators 11 and 13. In accordance with this feature of the invention a switch-over from the primary oscillator 11 to the secondary oscillator 13 is prevented not only if the secondary oscillator 13 shows an excessive frequency drift, but also if its output varies beyond predetermined limits in amplitude. Thus, it is assured that, when a switch-over occurs from the primary oscillator 11 to the secondary oscillator 13, the secondary oscillator will be one which produces a signal of the proper frequency and amplitude. Furthermore, means are also provided for causing a switch-over to occur from the primary oscillator 11 to the secondary oscillator 13 if the amplitude of the output $f_a$ produced by the primary oscillator varies beyond predetermined limits, and this regardless of the condition of the output signal $f_b$ produced by the secondary oscillator 13.

Turning to the last mentioned feature, first there is provided a first detecting means 71 responsive to the amplitude of the primary output signal $f_a$ and operative to produce an error signal should this amplitude vary beyond predetermined limits. Specifically, the first amplitude detecting means 71 has an input 71*a* connected to the output of the amplifier 19 and a "1" output connected over line 73 to the middle input 63*b* of the OR gate 63. In the event of an excessive deviation of the amplified primary output signal $f_a$ from normal amplitude, a logic "1" voltage level appears at the "1" output of the amplitude monitor 71 and, with the control switch in its normal or top position, this voltage level is permitted to pass through the AND gate 65 to the AND gate 25 and the inverter 29. By enabling AND gate 25 and (through inverter 29) disabling AND gate 21, the voltage level generated by the monitor 71 causes a switch-over to occur from the primary oscillator 11 to the secondary oscillator 13.

Turning now to the second mentioned feature, whereby the switch-over from the primary oscillator 11 to the secondary oscillator 13 is prevented in the event of an unsatisfactory amplitude in the secondary output signal $f_a$, a second amplitude detecting means 75 is provided with an input 75*a* connected to receive the amplified output $f_b$ of the secondary oscillator 13. The second amplitude monitor 75 has a "0" output upon which a logic "1" voltage level is maintained so long as the amplitude received by the monitor is within prescribed limits. As soon, however, as the signal amplitude received at the monitor input 75*a* falls outside of prescribed amplitude limits the voltage level appearing at the "0" output of the monitor changes to a logic "0" level. This output is connected over a line 76 to the input 61*b* of the AND gate 61, which was previously assumed to be at logic "1" voltage level. Thus, the AND gate 61 will be qualified to apply a logic "1" voltage level through the OR gate 63 and the AND gate 65 only if the amplitude of the signal produced by the secondary oscillator 13 is within the limits for which the second amplitude monitor 75 is designed. As a practical matter, in most cases only the lower limit needs monitoring because the type of failure sought to be detected results in insufficient, rather than excessive, output amplitude. A circuit which has been found suitable for this purpose includes a Darlington emitter-follower circuit and a temperature-compensated A.C. amplifier driving a peak-to-peak rectifier. The D.C. signal thus produced indicates a normally operating oscillator.

Turning now to FIG. 3, the specific circuit there shown for the phase comparator 35 will now be described.

The phase comparator 35 is made up of three subcircuits: an inverting amplifier 77, a non-inverting amplifier 79, and a monostable blocking oscillator 81. The inverting amplifier 77 has two stages, a non-inverting emitter-follower stage including a transistor 83, and an inverting grounded-emitter stage comprising a transistor 85. The first of the two signals to be compared for phase identity is applied to the input 35*a* of the comparator and coupled to the base of the first stage transistor 83 through a resistor-capacitor network 87. The non-inverted output produced by the transistor 83 is in turn coupled to the base of the second stage transistor 85 through a second resistor-capacitor network 89. The output of the two stage amplifier 77 appears at the collector of the transistor 85.

The second input signal to be compared is applied to the input 35*b* of the comparator 35 and is coupled to the base of the non-inverting transistor 79 through a resistor-capacitor network 92. The output of the transistor is taken from its emitter and is applied to a summing junction point 91 through a capacitor 93. Similarly, the output produced by the inverting amplifier 77 is fed to the junction point 91 through a second coupling capacitor 94.

The two amplifiers 77 and 79 are designed to have the same gain, so that equal magnitude signals at inputs 35*a* and 35*b* will result in equal amplitude signals at the outputs of the amplifiers. Therefore, so long as the signals which are applied at the inputs 35*a* and 35*b* are in phase, the voltages produced at the outputs of the amplifiers 77 and 79 cancel one another and no net output appears at the junction point 91. If on the other hand, one or the other of the input signals leads, there will appear at the junction point 91 a series of alternating polarity pulses whose width will be determined by the time lag between the two input signals. If, for example, the lagging input signal is ten nanoseconds behind the leading input signal, the pulses appearing at the point 91 will be ten nanoseconds long.

Turning now to the blocking oscillator 81, it is the well known Hartley oscillator having as its major components a transistor 95 connected in a grounded-collector configuration and a tapped coil 97. The collector-emitter circuit of the transistor is connected in series between a source of positive voltage, shown as +6 volts, and ground through a resistor 99, a second resistor 101, and the bottom portion 97*b*, of the coil 97. Regenerative feedback is provided by connecting the top portion 97*a* of the coil through a capacitor 103 to the base of the transistor 95.

Normally, the oscillator 81 is shut off by means of the voltage drop created across a biasing resistor 105 connected across the junction point of the resistors 99 and 101 and the base of transistor 95 and also connected in series between the +6 volt supply and ground through a resistor 107.

The blocking oscillator 81 is so designed that if a sufficiently large D.C. signal is applied to the base of the transistor 95 to turn the transistor on, the circuit will break into oscillations which will continue until the capacitor 103 is charged up again sufficiently to cut off the transistor 95. In order to insure the proper operation of the blocking oscillator circuit 81, its components are selected to cause the base-leak time constant of the circuit to be large compared to the period of oscillation of the circuit. Yet the number of cycles of oscillation occurring before self-blocking should be limited so that oscillations triggered during a given compare cycle of the system do not extend into the next compare cycle of the system, shown here as occurring one half second later. For the specific application described hereinabove, the blocking oscillator is tuned to approximately one mHz. by means of a capacitor 109 connected in parallel with the resistor 107.

As mentioned previously, a timing or phase error between the signals being applied at the inputs 35*a* and 35*b* will cause an alternating polarity pulse train to be produced at the junction point 91 by the amplifiers 77 and 79. The purpose of the blocking oscillator 81 is to indicate, by breaking into oscillations, the presence of pulses of sufficient width at the junction point 91, thereby warning of the presence of an excessive phase difference between the signals at the inputs 35*a* and 35*b*. To apply the alternating polarity pulse output appearing at the junction point 91 to the base of the transistor 95, a coupling network 111 is provided. It includes, in addition to the resistor 107 and the capacitor 109, an additional resistor 113 connected in series with the resistor 107 and an additional capacitor 115 connected in parallel with the resistor 113. The network 111 is connected between ground and the junction point 91, and the junction point of the resistors 107 and 113 is connected to the base of the oscillator transistor 95. By proper selection of the values of the resistor 107 and the capacitor 115 the amplitude and width of the pulses produced and applied to the base of the oscillator transistor 95 may be selected so that oscillations will occur only if the timing error between the signals being applied to the inputs 35*a* and 35*b* exceeds a predetermined limit. As a practical example, the circuit of the type shown in FIG. 3 has been built for detecting a forty nanosecond lag between signals under "worst case" conditions of lowest operating temperature.

The output of the comparator 35 is derived from the oscillations produced by the blocking oscillator 81. To convert the A.C. signals produced by the oscillator 81 into the required D.C. signal, a diode 117 and a resistor 119 connected in series therewith are connected across the coil 97, and the voltage which appears across the resistor 119 as a result of the rectified current driven therethrough is applied to the output terminal 35*c* of the comparator.

Operation of the exemplary system shown in FIG. 1 may be helpfully summarized by briefly describing its operation in the various possible failure modes which may occur. When the oscillator system is started, reset pulses are supplied to the flip-flops 53 and 55. Assuming that the oscillators 11 and 13 are operating properly, and further assuming that the control switch 69 is in its normal, top, position the output of the primary oscillator 11 will be applied to, and the output of the secondary oscillator 13 will be cut off from, the system output 10. If the primary output signal $f_a$ drops below minimum amplitude, a signal indicating this will be produced by the first amplitude detector 71 and fed over the line 73 and through gates 63 and 65 to cause immediate switch-over from the primary oscillator 11 to the secondary oscillator 13 by enabling AND gate 25 and disabling AND gate 21.

If the frequency of the primary output signal $f_a$ drifts excessively during a given cycle, the blocking oscillator 81 of the comparator 35 will be triggered into oscillation and will cause an error signal E1 to be deposited in the flip-flop 53. If at the same time, the frequency of the standby output signal $f_b$ is within limits, the blocking oscillator 81 will not be triggered into oscillation during the next cycle of the output signal and consequently an error signal E2 will not be deposited in the storage flip-flop 55. If, in addition, the amplitude of the standby output signal $f_b$ is also sufficient, a logic "1" signal will be applied by the second amplitude detector 75 to the AND gate 61 so that enabling signals will be applied to the three inputs of the AND gate 61 by the flip-flops 53 and 55 and the detector 75. As a result a logic "1" voltage level will be passed through the gate 61 and through the gates 63 and 65, causing an immediate switch-over to the secondary oscillator 13.

If either the frequency or the amplitude of the standby signal $f_b$ is defective no switch-over would occur since both of these criteria must be indicated as satisfactory in order that the AND gate 61 be enabled.

The foregoing description of an exemplary system embodying features of the invention has been specific for sake of clarity. It should be understood, however, that modifications may be made by those skilled in the art without departing from the scope of the invention. Merely as an example of the possible modifications which may be made, it is apparent that the frequency at which the system operates is not critical to the practice of the invention. Thus, the output frequency may be lowered by reducing the operating frequency of the oscillators 11, 13 and 17 or, alternatively, by increasing the input to output ratio of the frequency divider 15. As another example, it should be noted that the ratio between the duration of the time intervals devoted to checking the outputs of the respective oscillators 11 and 13 and the periods of the signals produced by those oscillators is not critical to the practice of the present invention. Consequently, the "frequency test" time intervals may be longer or shorter than the one second duration disclosed herein and need not have the same duration as, nor, indeed need they be necessarily related to, the period of the output signal produced by the system.

What is claimed is:

1. A high reliability oscillator system comprising in combination (a) an output point, (b) a reference oscillator for producing a reference signal of a given frequency, (c) a primary oscillator for producing a primary output signal of said frequency, (d) a secondary oscillator for producing a standby output signal of said frequency, (e) means for comparing the frequencies of said primary and said standby signals with the frequency of said reference signal and for producing first and second error signals when the frequency of respective ones of said first two signals varies by more than a predetermined amount from the frequency of said reference signal, and (f) control means connected between said primary and secondary oscillators and said output point for normally applying said primary output signal to said output point and for substituting said standby output signal for said primary output signal in response to the presence of said first signal at, and the absence of said second signal from, the output of said comparing means.

2. A high reliability oscillator system comprising in combination (a) an output point, (b) a reference oscillator for producing a reference signal of a given frequency, (c) a primary oscillator for producing a primary output signal of said frequency, (d) a secondary oscillator for producing a standby output signal of said frequency, (e) comparing means for individually signaling when the frequency of each of said primary and standby signals deviates by more than a predetermined amount from the frequency of said reference signal, (f) detecting means for individually signaling when the amplitude of each of said primary and standby signals deviates by more than a predetermined amount from a prescribed value, and (g) control means responsive to said comparing means and to said detecting means (1) for applying said primary signal to said output point so long as neither said comparing means nor said detecting means signals and excessive deviation in said primary signal, and (2) for applying said standby signal to said output point in place of said primary signal when said comparing means signals an excessive deviation in the frequency of said primary signal only, and said detecting means does not signal an excessive deviation in the amplitude of said standby signal.

3. A high reliability oscillator system comprising in combination (a) an output point, (b) a reference oscillator for producing a reference signal of a given frequency, (c) a primary oscillator for producing a primary output signal of said frequency, (d) a secondary oscillator for producing a standby output signal of said frequency, (e) means for comparing the frequencies of said primary and said standby signals with the frequency of said reference signal at regular interleaved time intervals and producing a signal during any of said time intervals in which the frequency of either of said first two signals differs by more than a predetermined amount from the frequency of said reference signal, (f) first and second signal storage means respectively connected to receive the signal produced by said comparing means during the time intervals in which said comparing means compares said primary and said standby signals with the frequency of said reference signal, and (g) control means connected between said primary and said secondary oscillators and said output point for normally applying said primary output signal to said output point and for substituting said standby output signal for said primary output signal in response to the presence of a signal in said first storage means and the absence of a signal from said second storage means during a given time period.

4. A high reliability oscillator system comprising in combination (a) an output point, (b) a reference oscillator for producing a reference signal of a given frequency, (c) a primary oscillator for producing a primary output signal of said frequency, (d) a secondary oscillator for producing a standby output signal of said frequency, (e) means for comparing the frequencies of said primary and said standby signals with the frequency of said reference signal during first and second series of interleaved time intervals respectively and for producing an error signal during any of said intervals in which the frequency of the compared signal deviates by more than a predetermined amount from the frequency of said reference signal, (f) first and second signal storage means, (g) means for connecting said first and second signal storage means to said comparing means to receive said error signal during said first and second series of time intervals respectively, (h) first and second detecting means respectively for signaling when the amplitude of said primary signal and said standby signal deviates by more than a predetermined amount from a prescribed value, and (i) control means responsive to said first and second storage means and to said first and second detecting means for (1) applying said primary signal to said output point in response to the concurrent absence of a signal at the outputs of said first storage means and said first detecting means, and (2) applying said standby signal to said output point in response to the concurrent presence of a signal at the output of said first storage means, absence of a signal at the output of said second storage means, and absence of a signal at the output of said second detecting means.

5. In a control system for substituting the output of a secondary oscillator for the output of a primary oscillator in the event of failure of the former, a time-shared frequency monitor comprising in combination (a) phase comparator means having a pair of inputs and an output for producing a signal when the phases of signals being applied to said inputs differ by more than a predetermined amount during a test interval, (b) a reference oscillator having a nominal operating frequency and including a phase locking circuit for conforming the phase of said oscillator to the phase of a signal applied to said phase locking circuit, (c) means for applying the output of said reference oscillator to the first input of said phase comparator means, (d) first timing means for applying the respective outputs of said primary and secondary oscillators to the second input of said phase comparator means during alternate, equal time intervals, and (e) second timing means for applying the respective outputs of said primary and secondary oscillators to said phase locking circuit during equal, initial portions of the time intervals in which said signals are being applied to said phase comparator means, thereby permitting said reference oscillator to operate at its nominal frequency during the terminal portions of said time intervals.

6. The combination of claim 5 additionally including (a) first and second signal storage means, and (b) means for connecting respective ones of said first and second signal storage means to receive the output of said phase comparator during at least said terminal portions of said time intervals in which the outputs of respective ones of said primary and secondary oscillators are applied to said comparator means.

7. The frequency monitor of claim 5 wherein said phase comparator includes (a) a non-inverting amplifier and an inverting amplifier, respective ones of said amplifiers having inputs connected to receive signals being applied to respective inputs of said phase comparator, (b) a blocking oscillator normally biased into quiescence, said oscillator having a trigger input and being operative to break into oscillations briefly in response to a signal of predetermined magnitude and duration at said trigger input, and (c) means for applying the sum of the outputs of said amplifiers to the trigger input of said blocking oscillator.

8. A high reliability oscillator system comprising in combination (a) an output point, (b) a reference oscillator having a nominal operating frequency and including a phase locking circuit for conforming the phase of said oscillator to the phase of a signal applied to said phase locking circuit, (c) a primary oscillator for producing a primary output signal of said operating frequency, (d) a secondary oscillator for producing a standby output signal of said operating frequency, (e) a phase comparator means having a pair of inputs and an output for producing a signal when the phases of signals being applied to said inputs differ by more than a predetermined amount during a test interval, (f) means for applying the output of said reference oscillator to the first input of said phase comparator means, (g) first timing means for applying the respective outputs of said primary and said secondary oscillators to the second input of said phase comparator means during first and second series of interspersed, regular time intervals, (h) second timing means for applying the respective outputs of said primary and said secondary oscillators to said phase locking circuit during equal initial portions of the time intervals in which said signals are being applied to said phase comparator means, thereby permitting said reference oscillator to operate at its nominal frequency during the terminal portion of said time intervals, (i) first and second storage means respectively connected to receive and store a signal produced by said phase comparator means during the terminal portions of said first and second series of time intervals, and (j) control means connected between said primary and said secondary oscillators and said output point for normally applying said primary output signal to said output point and for substituting said standby output signal for said primary output signal in response to the presence of a signal in said first storage means and the absence of a signal from said second storage means.

References Cited

UNITED STATES PATENTS

| | | | |
|---|---|---|---|
| 3,329,905 | 7/1967 | Niertit et al. | 331—49 |
| 3,370,251 | 2/1968 | Overstreet | 331—49 X |

ROY LAKE, *Primary Examiner.*

SIEGFRIED H. GRIMM, *Assistant Examiner.*

U.S. Cl. X.R.

331—27, 112; 340—292